United States Patent
Shin

(10) Patent No.: US 6,453,509 B1
(45) Date of Patent: Sep. 24, 2002

(54) HINGE ARRANGEMENT FOR A DISPLAY APPARATUS

(75) Inventor: Jong-Hwa Shin, Yongin (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/902,156

(22) Filed: Jul. 11, 2001

(30) Foreign Application Priority Data

Feb. 19, 2001 (KR) .......................................... 2001/8224

(51) Int. Cl.⁷ .......................... E05C 17/64; E05D 11/08; H05K 5/00
(52) U.S. Cl. ............................ 16/340; 16/337; 16/342; 16/371; 16/374; 248/917; 248/919; 361/682
(58) Field of Search ........................ 16/337, 340, 342, 16/371, 374; 248/917, 919, 920, 921, 922, 923; 361/681, 682, 683

(56) References Cited

U.S. PATENT DOCUMENTS

| | | | | |
|---|---|---|---|---|
| 3,979,791 A | * | 9/1976 | Collin | 16/342 |
| 5,208,944 A | * | 5/1993 | Lu | 16/278 |
| 5,566,048 A | * | 10/1996 | Esterberg et al. | 16/307 |
| 5,784,759 A | * | 7/1998 | King | 16/299 |
| 5,894,633 A | | 4/1999 | Kaneko | |
| 5,901,415 A | * | 5/1999 | Morrison et al. | 16/334 |
| 5,915,441 A | * | 6/1999 | Schlack | 16/334 |
| 6,081,969 A | * | 7/2000 | Tanahashi et al. | 16/223 |
| 6,286,187 B1 | * | 9/2001 | Chang | 16/340 |

FOREIGN PATENT DOCUMENTS

| | | |
|---|---|---|
| JP | 4-254683 | 9/1992 |
| JP | 6-17570 | 1/1994 |
| JP | 10-26128 | 1/1998 |
| JP | 11-214859 | 8/1999 |
| JP | 11-214860 | 8/1999 |
| JP | 2000-8688 | 1/2000 |
| KR | 1994-11764 | 6/1994 |
| KR | 1999-75422 | 10/1999 |
| KR | 1999-79371 | 11/1999 |

* cited by examiner

Primary Examiner—Gary S. Hartmann
(74) Attorney, Agent, or Firm—Robert E. Bushnell, Esq.

(57) ABSTRACT

The display apparatus comprises a monitor for displaying image thereon; and a hinge arrangement for rotatably connecting the monitor to a body and thereby allowing a torque to be adjusted depending upon a rotation angle of the monitor. There is a fixed bracket (10), a rotating bracket (20), and rotatably mounted adjusting brackets (30, 40). Rotational contact between the rotating bracket (20) and the adjusting brackets (30, 40) adjusts the torque applied to the rotating bracket.

19 Claims, 7 Drawing Sheets

HINGE ARRANGEMENT FOR A DISPLAY APPARATUS

CLAIM OF PRIORITY

This application makes reference to, incorporates the same herein, and claims all benefits accruing under 35 U.S.C §119 from an application entitled Display earlier filed in the Korean Industrial Property Office on Feb. 19, 2001, and there duly assigned Serial No. 2001-8224 by that Office.

BACKGROUND OF THE INVENTION

1. Field of the Invention

The present invention relates to a hinge arrangement, and more particularly, the present invention relates to a hinge arrangement for connecting a display apparatus with a body is improved.

2. Description of the Related Art

Conventionally, a display apparatus serves as an image display unit including a cathode ray tube (CRT) monitor or a liquid crystal display (LCD) monitor. The display apparatus generally embraces a monitor which is used with a computer, and its peripherals. Herein, as an example of a conventional display apparatus, a display apparatus which is used in a notebook computer, will be described.

A computer is composed of a body, a monitor and an input unit. In the body, there are arranged a main board having mounted thereto a central processing unit (CPU), a random access memory (RAM), a disk driver, and a variety of cards such as a graphic card, sound card, etc. The monitor is electrically connected to the body to display an image thereon. The input unit includes a keyboard which is used for inputting information into the body, a mouse, etc.

A hinge arrangement is disposed between the body and the monitor so as to rotatably support the monitor relative to the body. The hinge arrangement enables the monitor to be tilted relative to the body in upward and downward directions.

However, the conventional display apparatus suffers from defects in that, since a torque which is owned by the hinge arrangement within the range of a rotation angle of the monitor, is constant, it is difficult to optionally increase a rotation angle of the monitor relative to the body.

For example, in the case that a torque of the hinge arrangement is adjusted in such a way as to allow the range of a rotation angle of the monitor relative to the body to be set to 45°, the monitor can be rotated up to 45° without experiencing trouble. Nevertheless, when it is necessary to rotate the monitor beyond the range of 45°, a great deal of effort is needed for rotating the monitor.

On the contrary, in the case that a torque of the hinge arrangement is adjusted to a slight value, while the monitor can be easily rotated, it is difficult to continuously hold the monitor at a desired rotation angle.

SUMMARY OF THE INVENTION

Accordingly, the present invention has been made in an effort to solve the problems occurring in the related art, and an object of the present invention is to provide a hinge arrangement for a display apparatus which enables a torque to be adjusted in a diversity of ways depending upon a rotation angle of a monitor.

In order to achieve the above object, according to one aspect of the present invention, there is provided a monitor for displaying an image thereon and a hinge arrangement for rotatably connecting the monitor to a body and thereby allowing a torque to be adjusted depending upon a rotation angle of the monitor.

Here, the hinge arrangement includes a fixed bracket which is fastened to the body, a rotating bracket which is fastened to the monitor and is capable of being rotated relative to the fixed bracket, at least one adjusting bracket which is located adjacent to the rotating bracket to limit a rotation angle of the rotating bracket, and a hinge shaft which is fitted through the fixed bracket, the rotating bracket and the adjusting bracket.

The hinge arrangement possesses a first adjusting bracket which is located adjacent to one surface of the rotating bracket which one surface faces the fixed bracket and a second adjusting bracket which is located adjacent to the other surface of the rotating bracket; and each of the first and second adjusting brackets is formed with at least one stopper which is to be brought into contact with an edge surface of the rotating bracket to limit the rotation angle of the rotating bracket.

A pair of stoppers are formed at both ends, respectively, of each of the first and second adjusting brackets. Each stopper projects toward the rotating bracket from a surface of each adjusting bracket. Lengths of the first and second adjusting brackets are smaller than a length of the rotating bracket. It is advantageous that the first and second adjusting brackets are bent at center portions thereof by predetermined angles, relative to the rotating bracket.

Friction members are intervened between the rotating bracket and the first and second adjusting brackets in a manner such that the pair of friction members are fitted around the hinge shaft. The friction members are made of soft rubber.

A nut is threaded on the hinge shaft so as to prevent the brackets from being separated from the hinge shaft.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Reference will now be made in greater detail to a preferred embodiment of the invention, an example of which is illustrated in the accompanying drawings.

Herein below, an embodiment of the present invention will be described in connection with a notebook computer.

In this specification, a word "body" designates an element which is connected with a display apparatus in accordance with the embodiment of the present invention, such as a computer. However, a person skilled in the art will readily recognize that the concept of the present invention can be applied to a TV or the like in which a body and a display apparatus are integrally formed with each other.

Figure 1:
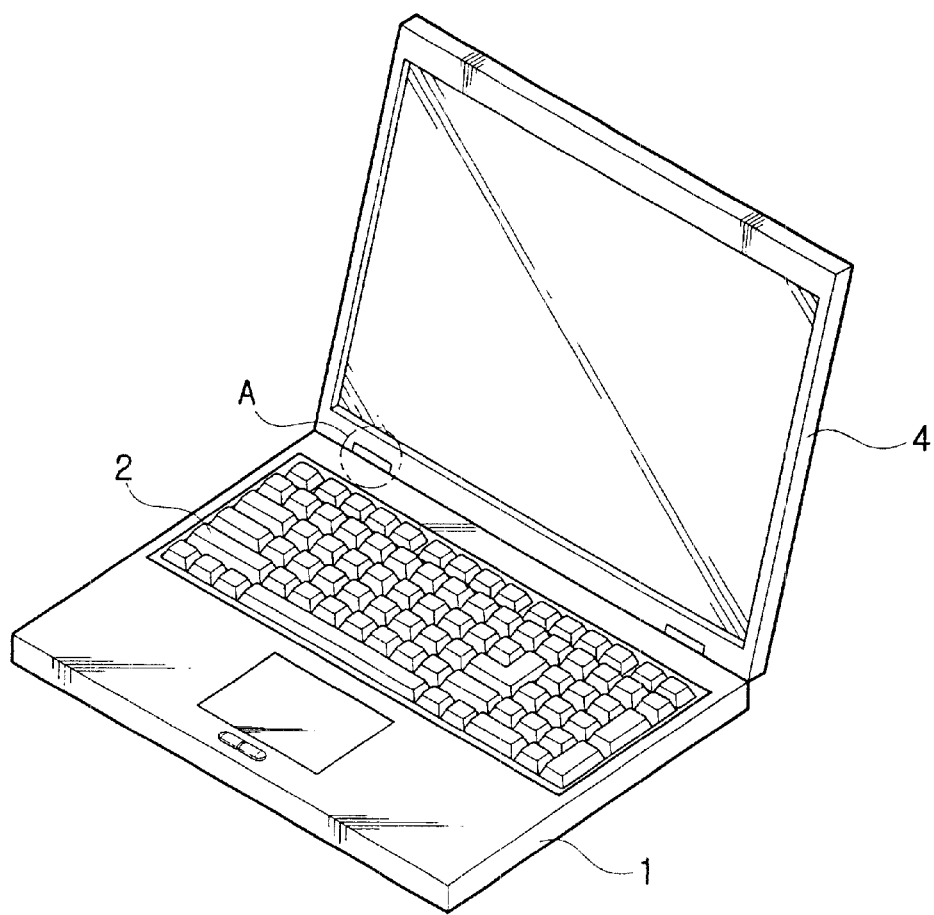
FIG. 1 is a perspective view illustrating a notebook (laptop) computer having a hinge apparatus connected between a body and a display apparatus in accordance with an embodiment of the present invention.

A computer to which the display apparatus is hingedly connected in accordance with the embodiment of the present invention, has, as shown in FIG. 1, a body 1 and a monitor 4 which is connected to the body 1 to display image thereon. In the body 1, there are arranged components for a desired computer system. An input unit (keyboard) 2 is also connected to the body 1 to allow desired information to be input into the body 1. The monitor 4 cooperates with a hinge arrangement 100 (see FIG. 2) at 'A' which will be described in detail below, according to the present invention.

Figure 2:
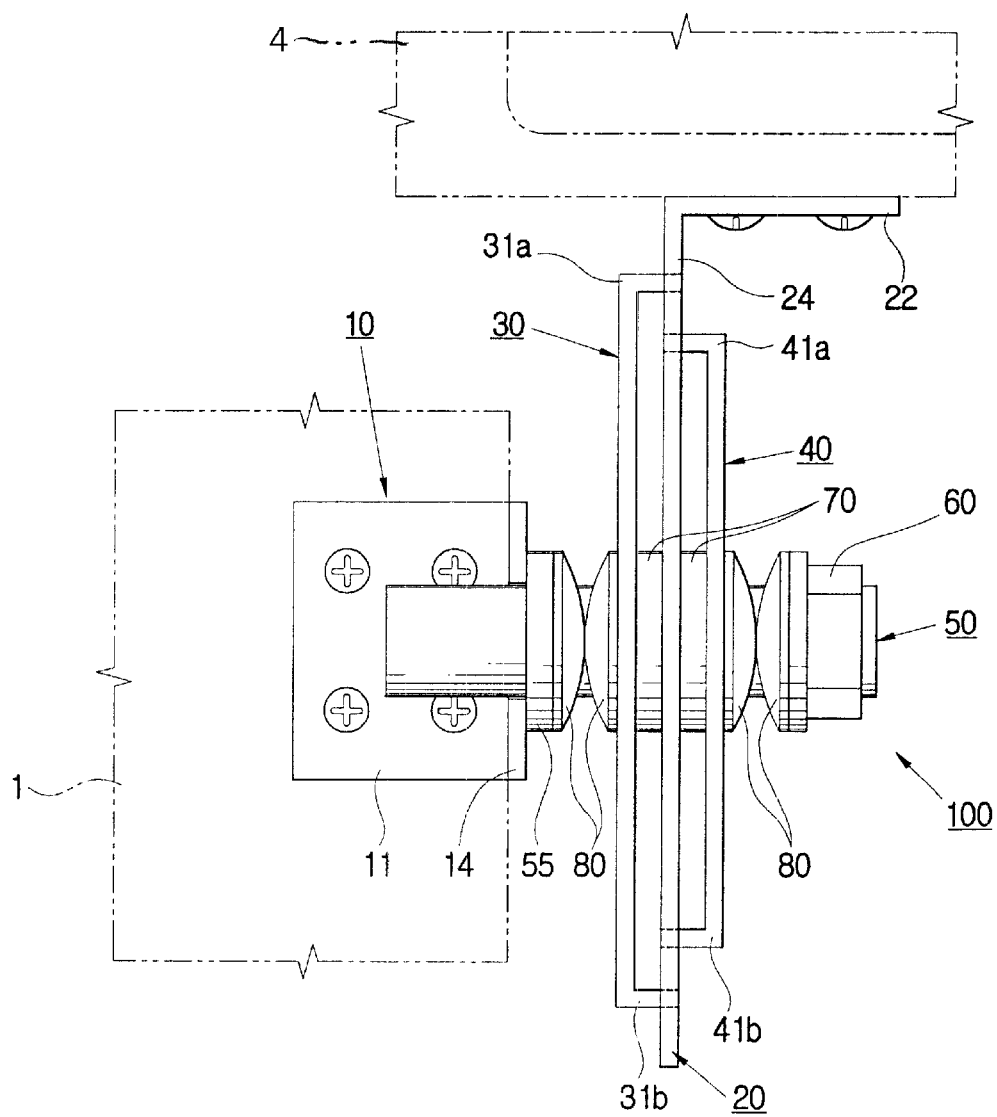
FIG. 2 is an enlarged view of the hinge arrangement at 'A' of FIG. 1.

As can be readily seen from FIG. 2, the hinge arrangement 100 is disposed between the body 1 and the monitor 4. The hinge arrangement 100 enables the monitor 4 to be tilted relative to the body 1 and allows a torque to be adjusted in a diversity of ways depending upon a rotation angle of the monitor 4.

The hinge arrangement 100 includes a fixed bracket 10 which is fastened to the body 1, a rotating bracket 20 which is affixed to the monitor 4 to be rotated or tilted relative to the fixed bracket 10, first and second adjusting brackets 30 and 40 which are located adjacent to one surface and the other surface, respectively, of the rotating bracket 20 to limit a rotation angle of the rotating bracket 20, and a hinge shaft 50 which is fitted through the fixed bracket 10, the rotating bracket 20 and the first and second adjusting brackets 30 and 40.

Figure 3:
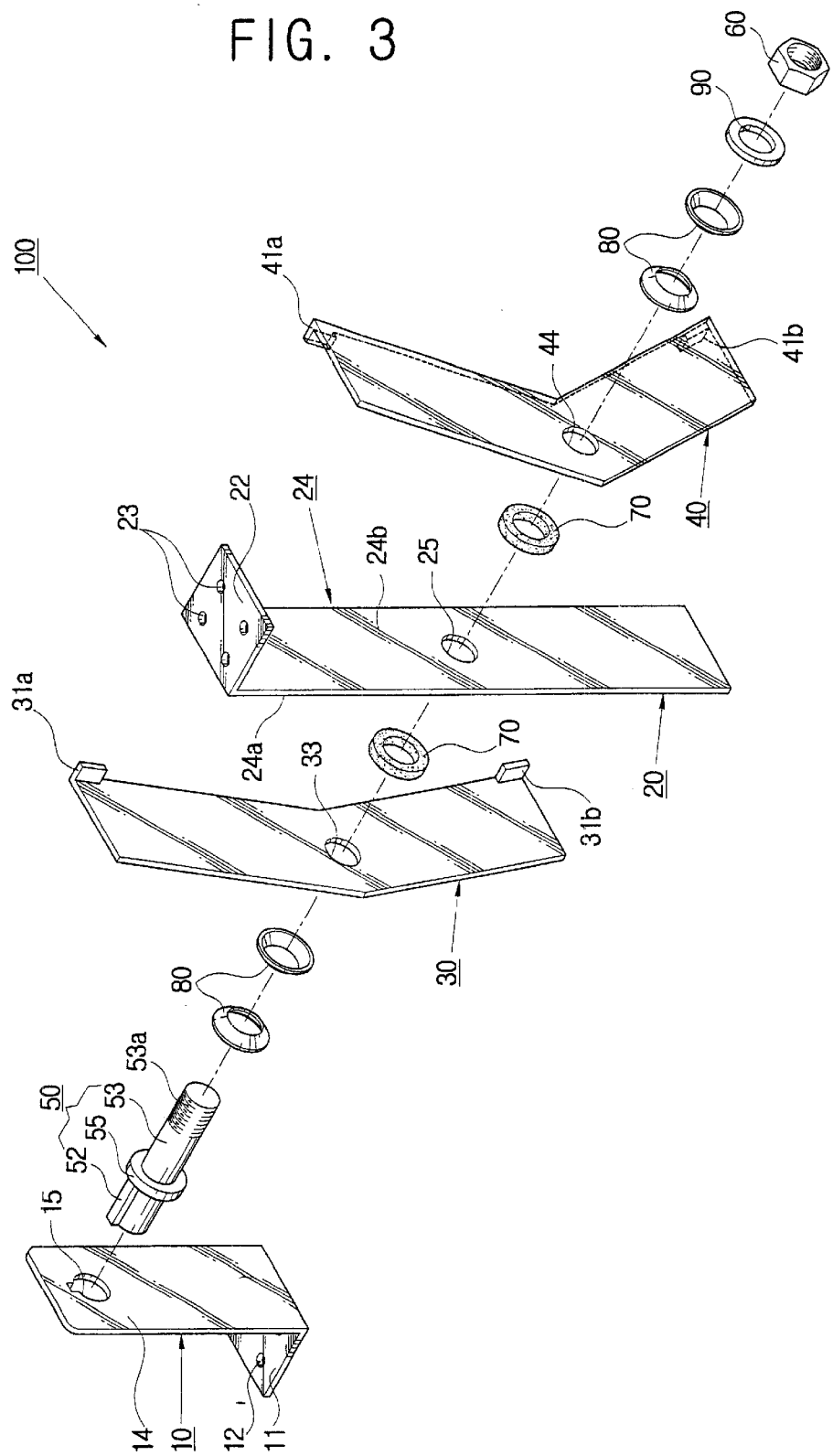
FIG. 3 is an exploded perspective view illustrating a hinge arrangement which is used with the display apparatus according to the present invention.

As shown in FIGS. 2 and 3, the fixed bracket 10 has a fastening portion 11 and a bent portion 14. The fastening portion 11 is defined with a plurality of first screw passing holes 12 in a manner such that the fixed bracket 10 can be fastened to the body 1 at the fastening portion 11 by means of screws which pass through the plurality of first screw passing holes 12, respectively. The bent portion 14 is bent substantially perpendicular to the fastening portion 11 and is defined with a first shaft hole 15 in a manner such that the hinge shaft 50 can extend through the first shaft hole 15, and the hinge shaft is prevented from rotating in first shaft hole 15.

The rotating bracket 20 has an affixing portion 22 and an elongated portion 24. The affixing portion 22 is defined with a plurality of second screw passing holes 23 in a manner such that the rotating bracket 20 can be affixed to the monitor 4 at the affixing portion 22 by means of screws which pass through the plurality of second screw passing holes 23, respectively. The elongated portion 24 is bent substantially perpendicular to the affixing portion 22 and is defined with a second shaft hole 25 in a manner such that the hinge shaft 50 can extend through the second shaft hole 25.

Figure 4:
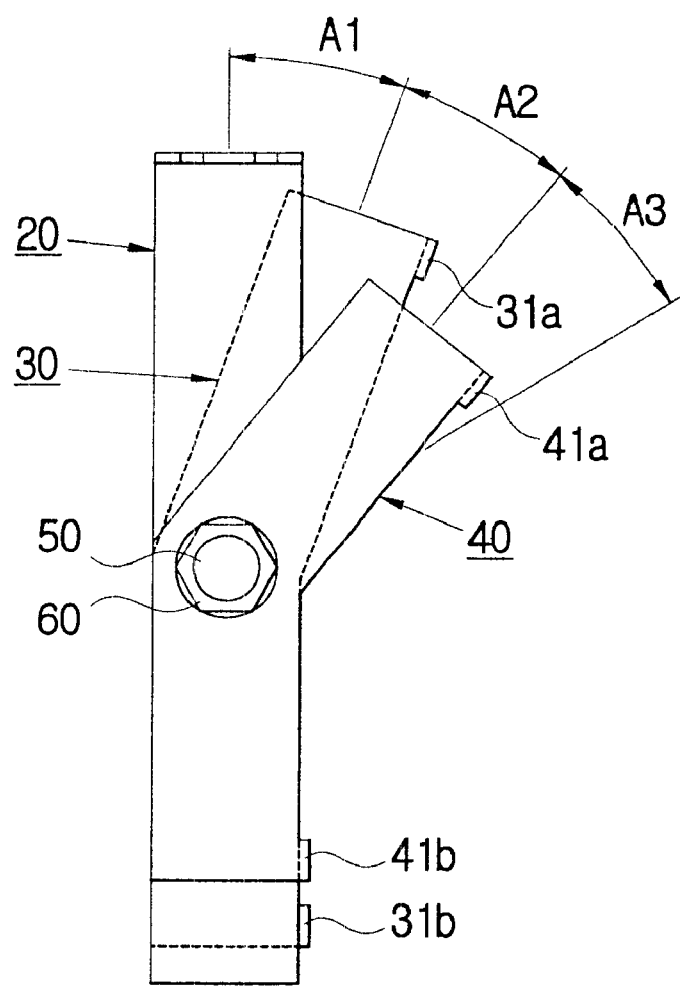
FIGS. 4 through 7 are side views illustrating operations of the hinge arrangement in the display apparatus according to the present invention.

As described above, the first and second adjusting brackets 30 and 40 are located adjacent to the one planer surface 24a and the other planer surface 24b, respectively, of the elongated portion 24 of rotating bracket 20 to limit the rotation angle of the rotating bracket 20. At this time, the first and second adjusting brackets 30 and 40 are formed to have lengths which are smaller than a length of the elongated portion 24 of rotating bracket 20. As best shown in FIG. 4, the first and second adjusting brackets 30 and 40 are bent (have a V bend) at center portions thereof by predetermined angles of A1 and A2, respectively, relative to the straight elongated portion 24 of rotating bracket 20.

The first and second adjusting brackets 30 and 40 are defined with third and fourth shaft holes 33 and 44, respectively, in a manner such that the hinge shaft 50 can extend through the third and fourth shaft holes 33 and 44. A pair of first stoppers 31a and 31b are formed at respective opposite ends of the first adjusting bracket 30 and a pair of second stoppers 41a and 41b are formed at respective opposite ends of the second adjusting bracket 40, in a manner such that the first stoppers 31a and 31b and the second stoppers 41a and 41b are brought into contact with an edge surface of the elongated portion 24 of rotating bracket 20 to limit the rotation angle of the rotating bracket 20. The pair of first stoppers 31a and 31b and the pair of second stoppers 41a and 41b project from both ends of the first and second adjusting brackets 30 and 40 toward the rotating bracket 20, That is, the pair of first stoppers 31a and 31b and the pair of second stoppers 41a and 41b extend horizontally from both ends of the vertically extending first and second adjusting brackets 30 and 40 toward each other and toward the rotating bracket 20.

A pair of friction members 70 are intervened between the rotating bracket 20 and the first and second adjusting brackets 30 and 40, respectively, in a manner such that the pair of friction members 70 are fitted around the hinge shaft 50. The friction members 70 are made of soft rubber so as to present elasticity and absorb friction upon rotation of the rotating bracket 20 relative to the first and second adjusting brackets 30 and 40 disposed between the first and second adjusting brackets 30 and 40.

The hinge shaft 50 has a first shaft portion 52 which is inserted through the first shaft hole 15 of the fixed bracket 10, and a second shaft portion 53 which is inserted through the second, third and fourth shaft holes 25, 33 and 44. An externally threaded portion 53a is formed on a circumferential outer surface of, and adjacent to, a free end of the second shaft portion 53, and a flange portion 55 is formed on a circumferential outer surface of the hinge shaft 50 between the first shaft portion 52 and the second shaft portion 53. A nut 60 is threaded to the threaded portion 53a so as to prevent the brackets 20, 30 and 40 from being separated from the hinge shaft 50.

A first pair of spring washers (or disk springs) 80 are interposed between the flange portion 55 of the hinge shaft 50 and the first adjusting bracket 30, and a second pair of spring washers 80 and a flat washer 90 are interposed between the second adjusting bracket 40 and the nut 60. A pair of friction members 70 are positioned adjacent to opposite sides of second shaft hole 25 and space the first and second adjusting brackets 30 and 40 from the elongated portion 24 of rotating bracket 20. Here, positions, kinds and the numbers of the friction members 70, spring washers 80 and the plain washer 90 can be varied as occasion and design demands.

Hereinafter, a procedure for assembling the display apparatus according to the present invention, constructed as mentioned above, to the body 1, will be described in detail.

First, by inserting the screws through the plurality of first screw passing holes 12 which are defined in the fastening portion 11 of the fixed bracket 10, the fixed bracket 10 is fastened to the body 1. Then, the first shaft portion 52 of the hinge shaft 50 is inserted through the first shaft hole 15 which is defined in the bent portion 14 of the fixed bracket 10. Thereupon, after the pair of first spring washers 80 are fitted around the second shaft portion 53 of the hinge shaft 50, the first adjusting bracket 30 is fitted around the hinge shaft 50 in manner such that the second shaft portion 53 of the hinge shaft 50 is inserted through the third shaft hole 33 of the first adjusting bracket 30.

Next, after the rotating bracket 20 and the second adjusting bracket 40 are sequentially fitted around the second shaft portion 53 of the hinge shaft 50 in a state wherein the pair of friction members 70 are intervened between the rotating bracket 20 and the first and second adjusting brackets 30 and 40, respectively, in a manner such that the second shaft portion 53 of the hinge shaft 50 is inserted through the second shaft hole 25 of the rotating bracket 20 and the fourth shaft hole 44 of the second adjusting bracket 40, the pair of second spring washers 80 and the flat washer 90 are fitted around the second shaft portion 53 of the hinge shaft 50. Thereafter, the nut 60 is threadedly coupled to the threaded portion 53a of the hinge shaft 50. By finally affixing the rotating bracket 20 to the monitor 4 at the affixing portion 22, the procedure for assembling the display apparatus according to the present invention to the body 1 is completed. It is preferred that a pair of hinge arrangements 100 are disposed between the body 1 and the monitor 4.

If assemblage of the display apparatus to the body 1 is completed in this way, the rotating bracket 20 and the first and second adjusting brackets 30 and 40 are configured as shown in FIG. 4. From this state, torque changes which occur when tilting the rotating bracket 20 in a stepwise manner by predetermined angles of A1, A2 and A3, will be explained below.

Figure 5:
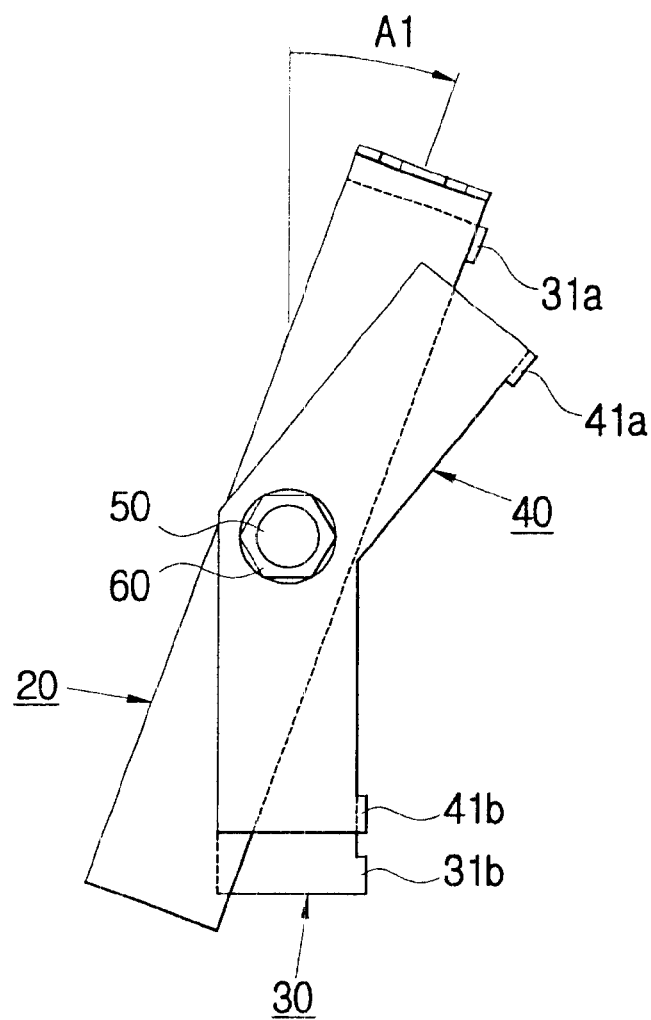

First, when the monitor is rotated backward, i.e., away from the user, the rotating bracket 20 is first tilted to the angle of A1, as shown in FIG. 5. The torque applied to the elongated portion 24 of rotating bracket 20 by friction members 70 is unchanged until and the edge surface of the rotating bracket 20 is brought into contact with the upper first stopper 31a of the first adjusting bracket 30. At this time, unless force is additionally applied to the rotating bracket 20, the rotating bracket 20 which is initially tilted by the angle of A1, is not tilted any more due to engagement between the edge surface of the rotating bracket 20 and the upper first stopper 31a of the first adjusting bracket 30.

If the rotating bracket 20 is further tilted to the angle of A2 so as to increase a tilting angle of the monitor 4, since the edge surface of the rotating bracket 20 is engaged with the upper first stopper 31a of the first adjusting bracket 30, the rotating bracket 20 is tilted integrally with the first adjusting bracket 30. At this time, a greater amount of force is required when compared to the case of tilting only the rotating bracket 20 to the angle of A1 due to the force applied to the first adjusting bracket 30 by the first pair of spring washers 80.

Figure 6:
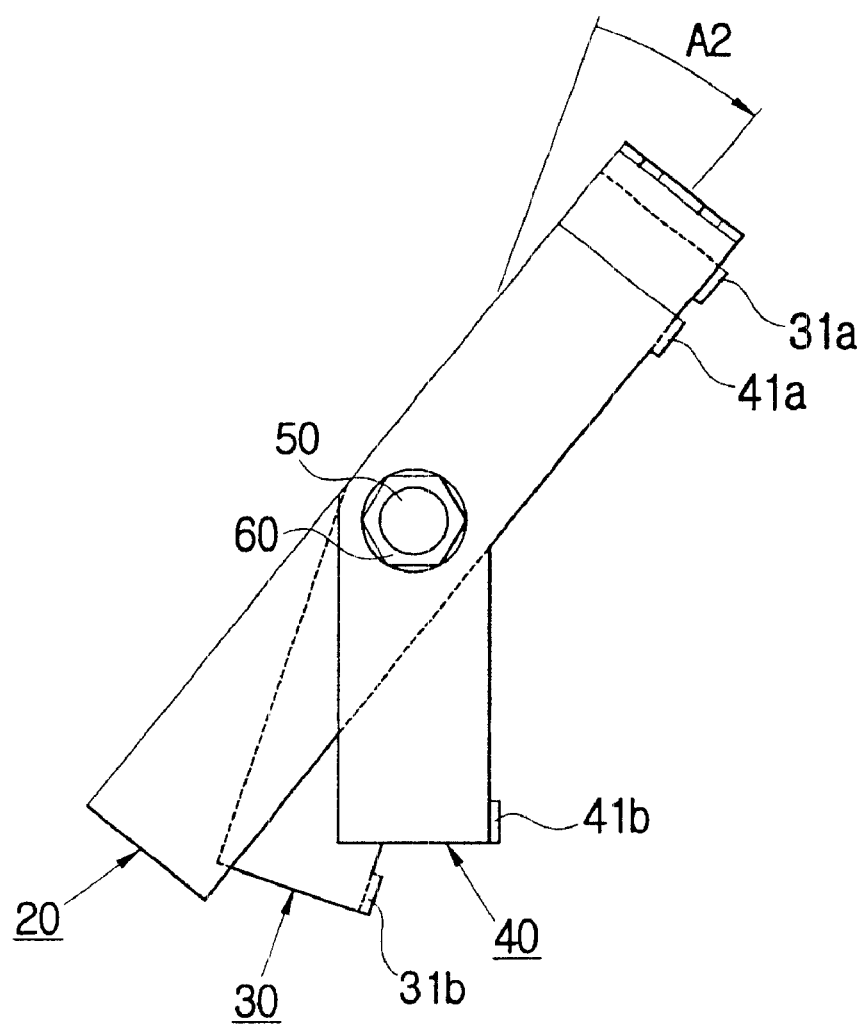

When the rotating bracket 20 is further titled to the angle of A2 as just described above, as can be readily seen from FIG. 6, the edge surface of the rotating bracket 20 is brought into contact with the upper second stopper 41a of the second adjusting bracket 40. In this state, upper portions of the rotating bracket 20 and the first and second adjusting brackets 30 and 40 are overlapped with one another as shown in FIG. 6.

Figure 7:
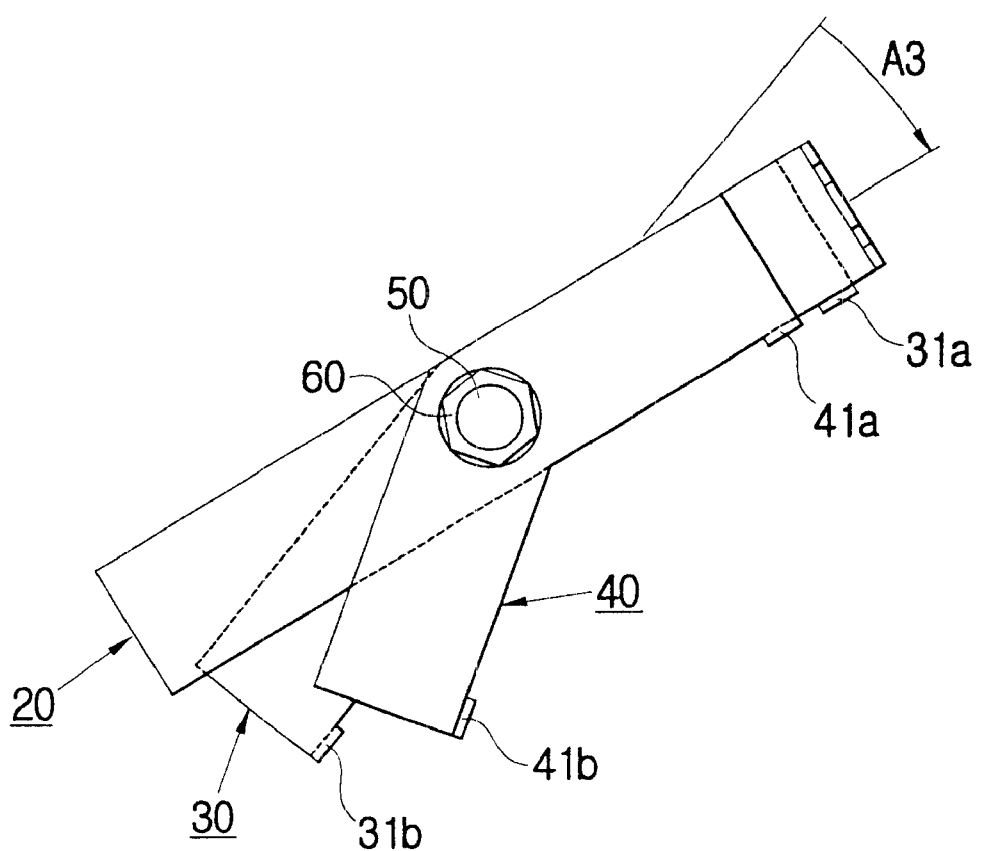

If the rotating bracket 20 is further tilted to the angle of A3, as can be readily seen from FIG. 7 so as to still further increase a tilting angle of the monitor 4, a greater amount of force is required when compared to the case of tilting the rotating bracket 20 to the angle of A2 due to the force applied to the second adjusting bracket 40 by the second pair of spring washers 80.

Likewise, in the case that the monitor is rotated in a forward direction toward the user, which is opposite to the backward direction as described above, the edge surface of the rotating bracket 20 is first brought into contact with the lower first stopper 31b of the first adjusting bracket 30, thereafter the rotating bracket 20 is integrally tilted with the first adjusting bracket 30. Then, due to further forward rotation of the monitor, the edge surface of the rotating bracket 20 is brought into contact with the lower second stopper 41b of the second adjusting bracket 40, and the rotating bracket 20 is integrally tilted with the first and second adjusting brackets 30 and 40.

As a consequence, by adjusting a torque in a diversity of ways in conformity with a tilt angle of the monitor 4, it is possible to hold a tilt angle of the monitor 4 at a variety of values, whereby an optimum viewing angle for the monitor 4 can be reliably secured.

Additionally, an increased in torque occurs when tilting the monitor towards a closed position, thereby preventing the monitor from falling to the closed position absent user manipulation.

As a result, according to the present invention, a display apparatus which enables a torque to be adjusted in a diversity of ways depending upon a rotation angle of a monitor, is provided.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A hinge arrangement for rotatably connecting a monitor to a body comprising:

a fixed bracket which is fastened to the body;

a rotating bracket which is fastened to the monitor and is capable of being rotated relative to the fixed bracket;

at least one rotatably mounted adjusting bracket which is located adjacent to a first side surface the rotating bracket to adjust a torque applied to the rotating bracket as the rotating bracket passes a predetermined rotation angle; and a hinge shaft which is fitted through the fixed bracket, the rotating bracket and the adjusting bracket.

2. The hinge arrangement as set forth in claim 1, further comprising a second adjusting bracket mounted on said hinge shaft, said second adjusting bracket being located adjacent to a second side surface of the rotating bracket to adjust the torque applied to the rotating bracket as the rotating bracket passes a second predetermined rotation angle.

3. The hinge arrangement as set forth in claim 2, said second adjusting bracket comprising:

a planer V shaped portion angled at said second predetermined rotation angle with respect to a vertical axis;

a first stopper extending horizontally from and perpendicular to a first distal end of said second adjusting bracket, characterized in that said first stopper contacts with an edge surface of the rotating bracket when the rotating bracket reaches said second predetermined rotation angle when said monitor is tilted up and away from a user; and a second stopper extending horizontally from and perpendicular to a second distal end of said second adjusting bracket, characterized in that said second stopper contacts with said edge surface of the rotating bracket when the rotating bracket reaches said second predetermined rotation angle when said monitor is tilted toward said user.

4. The hinge arrangement as set forth in claim 2, wherein the torque applied to the rotating bracket before the rotating bracket passes said first predetermined rotation angle is constant, is increased as the rotating bracket passes said first predetermined rotation angle and is further increased as the rotating bracket passes said second predetermined rotation angle.

5. The hinge arrangement as set forth in claim 2, said hinge shaft comprising:
   a first shaft portion mounted through a shaft hole in the fixed bracket;
   a second shaft portion on which the rotating bracket and both adjusting brackets are rotatably mounted; and
   a flange positioned between said first and second shaft portions.

6. The hinge arrangement as set forth in claim 5, further comprising:
   a first friction member mounted on said second shaft portion and disposed between said at least one adjusting bracket and said rotating bracket; and
   a pair of spring washers mounted on said second shaft portion and disposed between said flange and said at least one adjusting bracket.

7. The hinge arrangement as set forth in claim 6, further comprising:
   a second friction member mounted on said second shaft portion and disposed between said second adjusting bracket and said rotating bracket;
   a nut threaded on a threaded section of said second shaft portion;
   a flat washer mounted on said second shaft portion adjacent to said nut; and
   a second pair of spring washers mounted on said second shaft portion and disposed between said flat washer and said second adjusting bracket.

8. The hinge arrangement as set forth in claim 1, wherein the torque applied to the rotating bracket before the rotating bracket passes said first predetermined rotation angle is constant, and is increased as the rotating bracket passes said first predetermined rotation angle.

9. The hinge arrangement as set forth in claim 1, said hinge shaft comprising:
   a first shaft portion mounted through a shaft hole in said fixed bracket;
   a second shaft portion on which said rotating bracket and said adjusting bracket are rotatably mounted; and
   a flange positioned between said first and second shaft portions.

10. The hinge arrangement as set forth in claim 9, further comprising:
    a first friction member mounted on said second shaft portion and disposed between said adjusting bracket and said rotating bracket; and
    a pair of spring washers mounted on said second shaft portion and disposed between said flange and said adjusting bracket.

11. The hinge arrangement as set forth in claim 1, said adjusting bracket comprising:
    a planer V shaped portion angled at said predetermined rotation angle; and
    at least one stopper which contacts with an edge surface of the rotating bracket when the rotating bracket reaches said predetermined rotation angle.

12. The hinge arrangement as set forth in claim 1, said adjusting bracket comprising:
    a planer V shaped portion angled at said predetermined rotation angle with respect to a vertical axis;
    a first stopper extending horizontally from and perpendicular to a first distal end of said adjusting bracket, characterized in that said first stopper contacts with an edge surface of the rotating bracket when the rotating bracket reaches said predetermined rotation angle when said monitor is tilted up and away from a user; and
    a second stopper extending horizontally from and perpendicular to a second distal end of said adjusting bracket, characterized in that said second stopper contacts with said edge surface of the rotating bracket when the rotating bracket reaches said predetermined rotation angle when said monitor is tilted toward said user.

13. The hinge arrangement as set forth in claim 1, further comprising:
    a first friction member mounted on said hinge shaft between said adjusting bracket and said rotating bracket; and
    a pair of spring washers mounted on said hinge shaft between said fixed bracket and said adjusting bracket.

14. A hinge arrangement for rotatably connecting a monitor to a body comprising:
    a fixed bracket which is fastened to the body;
    a rotating bracket which is fastened to the monitor and is capable of being rotated relative to the fixed bracket;
    at least one rotatably mounted adjusting bracket which is located adjacent to a first side surface the rotating bracket to adjust a torque applied to the rotating bracket as the rotating bracket passes a predetermined rotation angle;
    a hinge shaft which is fitted through the fixed bracket, the rotating bracket and the adjusting bracket;
    a first friction member mounted on said hinge shaft between said adjusting bracket and said rotating bracket; and
    a pair of spring washers mounted on said hinge shaft between said fixed bracket and said adjusting bracket.

15. The hinge arrangement as set forth in claim 14, said hinge shaft comprising:
    a first shaft portion mounted through a shaft hole in said fixed bracket;
    a second shaft portion on which said rotating bracket and said adjusting bracket are rotatably mounted; and
    a flange positioned between said first and second shaft portions, said flange being disposed to contact said fixed bracket to permit only said first shaft portion to pass through said shaft hole in said fixed bracket.

16. The hinge arrangement as set forth in claim 15, further comprising:
    a second adjusting bracket mounted on said hinge shaft, said second adjusting bracket being located adjacent to a second side surface of the rotating bracket to adjust the torque applied to the rotating bracket as the rotating bracket passes a second predetermined rotation angle;
    a second friction member mounted on said second shaft portion and disposed between said second adjusting bracket and said rotating bracket;
    a nut threaded on a threaded section of said second shaft portion;
    a flat washer mounted on said second shaft portion adjacent to and in contact with said nut; and a second pair of spring washers mounted on said second shaft portion and disposed between said flat washer and said second adjusting bracket.

17. The hinge arrangement as set forth in claim 16, said second adjusting bracket comprising:
- a planer V shaped portion angled at said second predetermined rotation angle with respect to a vertical axis;
- a first stopper extending horizontally from and perpendicular to a first distal end of said second adjusting bracket, characterized in that said first stopper contacts with an edge surface of the rotating bracket when the rotating bracket reaches said second predetermined rotation angle when said monitor is tilted up and away from a user; and
- a second stopper extending horizontally from and perpendicular to a second distal end of said second adjusting bracket, characterized in that said second stopper contacts with said edge surface of the rotating bracket when the rotating bracket reaches said second predetermined rotation angle when said monitor is tilted toward said user.

18. The hinge arrangement as set forth in claim 17, wherein the torque applied to the rotating bracket before the rotating bracket passes said first predetermined rotation angle is constant, is increased as the rotating bracket passes said first predetermined rotation angle and is further increased as the rotating bracket passes said second predetermined rotation angle.

19. A The hinge arrangement as set forth in claim 14, said adjusting bracket comprising:
- a planer V shaped portion angled at said predetermined rotation angle with respect to a vertical axis;
- a first stopper extending horizontally from and perpendicular to a first distal end of said adjusting bracket, characterized in that said first stopper contacts with an edge surface of the rotating bracket when the rotating bracket reaches said predetermined rotation angle when said monitor is tilted up and away from a user; and
- a second stopper extending horizontally from and perpendicular to a second distal end of said adjusting bracket, characterized in that said second stopper contacts with said edge surface of the rotating bracket when the rotating bracket reaches said predetermined rotation angle when said monitor is tilted toward said user.

* * * * *